US009965466B2

(12) United States Patent
Kidwai et al.

(10) Patent No.: US 9,965,466 B2
(45) Date of Patent: May 8, 2018

(54) LANGUAGE CONTENT TRANSLATION

(71) Applicant: United Parcel Service of America, Inc., Atlanta, GA (US)

(72) Inventors: Yursil A Kidwai, Paramus, NJ (US); William Gensburg, Larchmont, NY (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days. days.

(21) Appl. No.: 14/332,717

(22) Filed: Jul. 16, 2014

(65) Prior Publication Data
US 2016/0019205 A1   Jan. 21, 2016

(51) Int. Cl.
*G06F 17/28* (2006.01)
*G06F 17/27* (2006.01)

(52) U.S. Cl.
CPC ........ *G06F 17/2836* (2013.01); *G06F 17/275* (2013.01); *G06F 17/28* (2013.01)

(58) Field of Classification Search
CPC ..... G06F 17/2836; G06F 17/28; G06F 17/289
USPC .................................................. 704/2, 7, 8
See application file for complete search history.

(56) References Cited

U.S. PATENT DOCUMENTS 4,383,306 A   5/1983   Morimoto et al.
4,713,761 A   12/1987  Sharpe et al.
4,766,293 A   8/1988   Boston
4,799,156 A   1/1989   Shavit et al.
4,926,368 A   5/1990   Morita et al.
(Continued)

FOREIGN PATENT DOCUMENTS

CA          2309634 A1    6/1998
WO   WO 1996/008783 A1   3/1996
(Continued)

OTHER PUBLICATIONS

Oracle, "Class String Tokenizer" [online] [retrieved Aug. 18, 2014] Retrieved from the Internet <URL:http://docs.oracle.com/javase/7/docs/api/java/util/StringTokenizer.html>, 6 pages.
(Continued)

*Primary Examiner* — Richemond Dorvil
*Assistant Examiner* — Mark Villena
(74) *Attorney, Agent, or Firm* — Shook, Hardy & Bacon L.L.P.

(57) ABSTRACT

In an embodiment, a method comprises receiving, at a translation server, a request for translation services from a requesting device for text data associated with a token and a first language; retrieving, at the translation server, a translated version of the text data in a second language from a translation database storing automatically translated text data and manually translated text data, if the token matches a previously processed token; retrieving, at the translation server, the translated version of the text data in the second language from an automated translation service, if the token does not match the previously processed token; retrieving, at the translation server, the translated version of the text data in the second language from the manual translation service; and transmitting, at the translation server, one or more of the automatically translated text data and the manually translated text data to the requesting device.

27 Claims, 5 Drawing Sheets

| TOKEN | GEOCODED INDICATOR | TEXT DATA | ENTRY DATE | SOURCE OF TRANSLATION |
|---|---|---|---|---|
| 67942 | 348 | la biblioteca | 2013-04-22 | M |
| 11392 | 990 | einen schönen Tag | 2013-01-05 | M |
| 19474 | 004 | The fabric is made of imported silk | 2014-05-19 | A |
| 22356 | 789 | ing forcast cuaca Cetha kanggo minggu sabanjure | 2010-09-23 | M |
| 34001 | 004 | the weather forcast is clear for the next week | 2011-10-03 | A |
| 47893 | 113 | ing forcast cuaca Cetha kanggo minggu sabanjure | 2012-03-20 | A |
| 60056 | 713 | inserisci i dati della carta di credito di seguito | 2010-04-27 | A |

(56) References Cited

U.S. PATENT DOCUMENTS

| | | | |
|---|---|---|---|
| 4,974,028 A | 11/1990 | Enoguchi et al. | |
| 4,992,940 A | 2/1991 | Dworkin | |
| 5,063,506 A | 11/1991 | Brockwell et al. | |
| 5,077,804 A | 12/1991 | Richard | |
| 5,128,862 A | 7/1992 | Mueller | |
| 5,285,383 A | 2/1994 | Lindsey et al. | |
| 5,319,542 A | 7/1994 | King, Jr. et al. | |
| 5,335,169 A | 8/1994 | Chong | |
| 5,351,189 A | 9/1994 | Doi et al. | |
| 5,420,405 A | 5/1995 | Chasek | |
| 5,557,780 A | 9/1996 | Edwards et al. | |
| 5,592,378 A | 1/1997 | Cameron et al. | |
| 5,594,225 A | 1/1997 | Botvin | |
| 5,630,125 A | 5/1997 | Zellweger | |
| 5,631,827 A | 5/1997 | Nicholls et al. | |
| 5,644,115 A | 7/1997 | Knauer | |
| 5,644,721 A | 7/1997 | Chung et al. | |
| 5,664,115 A | 7/1997 | Knauer | |
| 5,664,721 A | 7/1997 | Chung et al. | |
| 5,666,493 A | 9/1997 | Wojcik et al. | |
| 5,671,279 A | 9/1997 | Elgamal | |
| 5,694,551 A | 12/1997 | Doyle et al. | |
| 5,710,887 A | 1/1998 | Chelliah et al. | |
| 5,715,314 A | 2/1998 | Payne et al. | |
| 5,717,989 A | 2/1998 | Tozzoli et al. | |
| 5,721,832 A | 2/1998 | Westrope et al. | |
| 5,758,328 A | 5/1998 | Giovannoli | |
| 5,787,400 A | 7/1998 | Weber | |
| 5,799,283 A | 8/1998 | Francisco et al. | |
| 5,802,293 A | 9/1998 | Van der Sijpt | |
| 5,812,668 A | 9/1998 | Weber | |
| 5,839,088 A | 11/1998 | Hancock et al. | |
| 5,842,178 A | 11/1998 | Giovannoli | |
| 5,850,446 A | 12/1998 | Berger et al. | |
| 5,870,473 A | 2/1999 | Boesch et al. | |
| 5,870,717 A | 2/1999 | Wiecha | |
| 5,875,433 A | 2/1999 | Francisco et al. | |
| 5,889,863 A | 3/1999 | Weber | |
| 5,890,130 A | 3/1999 | Cox et al. | |
| 5,892,900 A | 4/1999 | Ginter et al. | |
| 5,893,076 A | 4/1999 | Hafner et al. | |
| 5,895,454 A | 4/1999 | Harrington | |
| 5,897,621 A | 4/1999 | Boesch et al. | |
| 5,897,622 A | 4/1999 | Blinn et al. | |
| 5,910,896 A | 6/1999 | Hahn-Carlson | |
| 5,910,987 A | 6/1999 | Ginter et al. | |
| 5,960,200 A | 9/1999 | Eager et al. | |
| 5,968,110 A | 10/1999 | Westrope et al. | |
| 5,970,475 A | 10/1999 | Barnes et al. | |
| 5,971,273 A | 10/1999 | Vallaire | |
| 5,987,429 A | 11/1999 | Maritzen et al. | |
| 5,991,394 A | 11/1999 | Dezonno et al. | |
| 5,999,914 A | 12/1999 | Blinn et al. | |
| 6,049,811 A | 4/2000 | Petruzzi et al. | |
| 6,058,373 A | 5/2000 | Blinn et al. | |
| 6,073,090 A | 6/2000 | Fortune et al. | |
| 6,141,647 A | 10/2000 | Meijer et al. | |
| 6,185,683 B1 | 2/2001 | Ginter et al. | |
| 6,205,433 B1 | 3/2001 | Boesch et al. | |
| 6,373,950 B1 | 4/2002 | Rowney | |
| 6,460,020 B1 | 10/2002 | Pool et al. | |
| 6,523,172 B1* | 2/2003 | Martinez-Guerra | G06F 8/427 704/9 |
| 6,594,692 B1 | 7/2003 | Reisman | |
| 6,964,014 B1 | 11/2005 | Parish | |
| 7,441,184 B2 | 10/2008 | Frerebeau et al. | |
| 7,904,595 B2 | 3/2011 | Cheng et al. | |
| 8,050,906 B1 | 11/2011 | Zimmerman et al. | |
| 2001/0055393 A1* | 12/2001 | Sundaravel | G06F 17/30241 380/258 |
| 2002/0112003 A1 | 8/2002 | Glorikian | |
| 2002/0129064 A1 | 9/2002 | Guthrie | |
| 2002/0156645 A1 | 10/2002 | Hansen | |
| 2002/0174031 A1 | 11/2002 | Weiss | |
| 2002/0174065 A1 | 11/2002 | Coward | |
| 2002/0184308 A1 | 12/2002 | Levy et al. | |
| 2003/0083889 A1 | 5/2003 | Macklin | |
| 2003/0084401 A1 | 5/2003 | Abel et al. | |
| 2003/0131316 A1 | 7/2003 | Brown et al. | |
| 2004/0047287 A1 | 3/2004 | Tremblay et al. | |
| 2004/0186732 A1* | 9/2004 | Okura | G06F 17/2836 704/277 |
| 2004/0205118 A1 | 10/2004 | Yu | |
| 2005/0102178 A1 | 5/2005 | Phillips et al. | |
| 2006/0031436 A1 | 2/2006 | Sakata et al. | |
| 2006/0136237 A1 | 6/2006 | Spiegel et al. | |
| 2006/0136309 A1 | 6/2006 | Horn et al. | |
| 2006/0287844 A1* | 12/2006 | Rich | G06F 17/289 704/2 |
| 2007/0192468 A1 | 8/2007 | Keeler | |
| 2008/0108370 A1* | 5/2008 | Aninye | B60R 25/1004 455/456.1 |
| 2008/0148383 A1 | 6/2008 | Pitchaikani et al. | |
| 2008/0262828 A1* | 10/2008 | Och | G06F 17/2818 704/3 |
| 2008/0275966 A1 | 11/2008 | MacKinnon | |
| 2009/0092134 A1 | 4/2009 | Herrera Schuvab | |
| 2009/0119091 A1 | 5/2009 | Sarig | |
| 2009/0132230 A1* | 5/2009 | Kanevsky | G06F 17/289 704/2 |
| 2009/0319257 A1* | 12/2009 | Blume | G06F 17/278 704/7 |
| 2009/0326914 A1* | 12/2009 | Joy | G06F 17/2223 704/3 |
| 2010/0223048 A1* | 9/2010 | Lauder | G06F 17/2836 704/4 |
| 2012/0016655 A1* | 1/2012 | Travieso | G06F 17/2827 704/2 |
| 2012/0137210 A1 | 5/2012 | Dillon | |
| 2012/0323704 A1 | 12/2012 | Steelberg et al. | |
| 2013/0036351 A1 | 2/2013 | King et al. | |
| 2013/0262080 A1* | 10/2013 | Marciano | G06F 17/2836 704/3 |
| 2013/0288633 A1* | 10/2013 | Lemberg | H04W 4/14 455/404.1 |
| 2013/0300562 A1 | 11/2013 | Krasinskiy et al. | |
| 2014/0052593 A1 | 2/2014 | Pool et al. | |
| 2014/0081619 A1* | 3/2014 | Solntseva | G06F 17/289 704/3 |
| 2014/0142917 A1* | 5/2014 | D'Penha | G06F 17/2836 704/2 |
| 2014/0164902 A1 | 6/2014 | Sager | |
| 2014/0278342 A1* | 9/2014 | Shoshan | G06F 17/289 704/2 |
| 2014/0317078 A1* | 10/2014 | Gallagher | G06F 17/30867 707/706 |
| 2014/0351277 A1* | 11/2014 | Rinne | G06F 17/30041 707/756 |
| 2014/0351798 A1* | 11/2014 | Ross | G06F 9/4448 717/137 |
| 2014/0358736 A1 | 12/2014 | Sager | |
| 2015/0120273 A1* | 4/2015 | Gusakov | G06F 17/289 704/2 |
| 2015/0286632 A1* | 10/2015 | Meunier | G06F 17/2854 704/2 |

FOREIGN PATENT DOCUMENTS

| | | |
|---|---|---|
| WO | WO 1997/031322 A1 | 8/1997 |
| WO | WO 2012/115507 A1 | 8/2012 |

OTHER PUBLICATIONS

Google, "Translate" [online] [retrieved Aug. 18, 2014] Retrieved from the Internet <URL:https://translate.google.com/>, 1 page.

"A Basic Guide to Exporting", Unz & Co., Inc. 1998 [Retrieved on Apr. 12, 2001] Retrieved from Internet <URL:http://www.unzco.com/basicguide/index.html>.

Cahn, What Benefits will Global EDI Offer?, Jun. 1992, Transmission & Distribution.

(56) References Cited

OTHER PUBLICATIONS

Del Busto, Charles, UCP 500 & 400 Compared, ICC Publishing (1993) iii-xvi, 1-134, see 99-100.
Ramberg, Jan; Guide to Incoterms, International Commercial Terms, (1990) 1-152, ICC Publishing (1991).
Schell, Ernest, Business 400: Not Just for Catalogs, Mar. 1991, Catalog Age, pp. 147-148.
International Searching Authority, International Search Report and Written Opinion for International Application No. PCT/US2015/032512, dated Aug. 24, 2015, 12 pages, European Patent Office, The Netherlands.
International Preliminary Examining Authority, Written Opinion for International Application No. PCT/US2015/032512, dated Jul. 5, 2016, 8 pages, European Patent Office, Germany.
International Preliminary Examining Authority, International Preliminary Report on Patentability for International Application No. PCT/US2015/032512, including Applicant's Amendments dated May 13, 2016 and Aug. 31, 2016, dated Oct. 14, 2016, 37 pages, European Patent Office, Germany.
CA Office Action dated Nov. 7, 2017 for CA Application No. 2956187.

\* cited by examiner

| TOKEN | GEOCODED INDICATOR | TEXT DATA | ENTRY DATE | SOURCE OF TRANSLATION |
|---|---|---|---|---|
| 67942 | 348 | la biblioteca | 2013-04-22 | M |
| 11392 | 990 | einen schönen Tag | 2013-01-05 | M |
| 19474 | 004 | The fabric is made of imported silk | 2014-05-19 | A |
| 22356 | 789 | ing forcast cuaca Cetha kanggo minggu sabanjure | 2010-09-23 | M |
| 34001 | 004 | the weather forcast is clear for the next week | 2011-10-03 | A |
| 47893 | 113 | ing forcast cuaca Cetha kanggo minggu sabanjure | 2012-03-20 | A |
| 60056 | 713 | inserisci i dati della carta di credito di seguito | 2010-04-27 | A |

FIGURE 5

LANGUAGE CONTENT TRANSLATION

TECHNICAL FIELD

The present disclosure generally relates to providing language translated text data to a requesting device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Websites such as https://translate.google.com/ provide an automated language translation service. A user can enter text and/or an Internet website. Automated language translation services translate the user provided text and/or text associated with the Internet website into a language designated by the user. Automated language translation services perform a word by word translation. Unfiltered word by word language translation often results in translated text that does not reflect the true meaning of the user provided text and/or the text associated with the Internet website. Automated language translation services are generally only suitable to convey a general meaning of the translated text, are often inaccurate, and/or often offer embarrassing translations.

Website providers can use manual language translation services in order to offer basic localization for international visitors to their website. Manual language translation of a large website with numerous product definitions into numerous languages can require months of manual translation work, at greats costs. Manual language translation requires intensive effort to achieve a useable result. Further, as new content is added to the website the website provider becomes responsible for essentially maintaining parallel websites with unique language content on each, requiring continuous manual updates.

BRIEF DESCRIPTION OF THE DRAWINGS

Reference is made to the attached drawings, wherein elements having the same reference numeral designations represent like elements throughout and wherein:

FIG. 5 illustrates an example translation database record, according to an example embodiment.

DESCRIPTION OF EXAMPLE EMBODIMENTS

Overview

Figure 1:
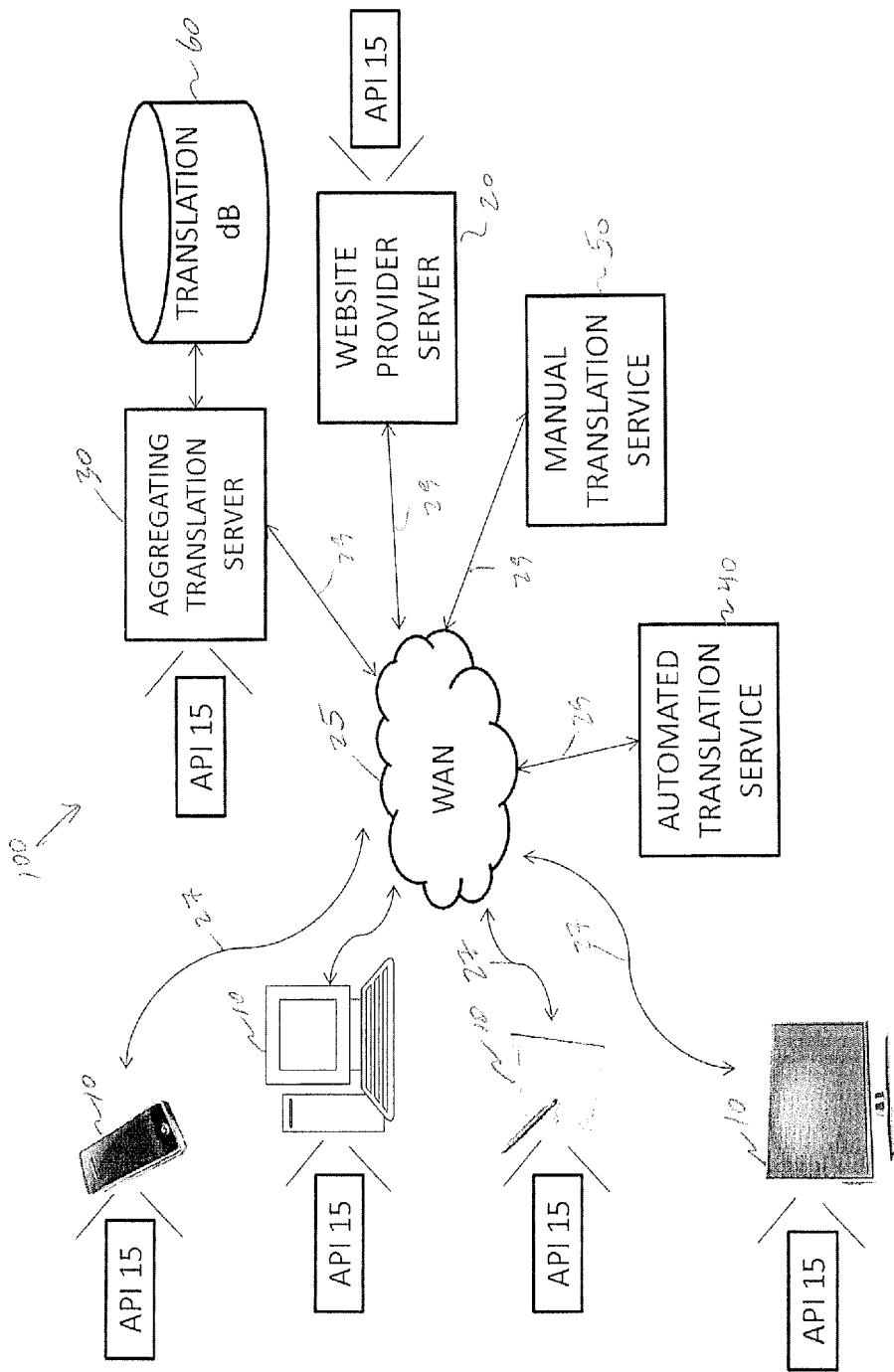
FIG. 1 illustrates an example system having an apparatus for providing language translated text data, according to an example embodiment.

In one embodiment, an apparatus comprises a network interface circuit and a processor circuit. The network interface circuit can be configured to establish communications with a requesting device. The processor circuit can be configured to control receiving a request for translation services from the requesting device for text data associated with a token and a first language, control retrieving a translated version of the text data in a second language from a translation database storing automatically translated text data associated with an automated translation service and manually translated text data associated with a manual translation service if the token matches a previously processed token, control retrieving the translated version of the text data in the second language from the automated translation service if the token does not match the previously processed token, control retrieving the translated version of the text data in the second language from the manual translation service, and control transmitting one or more of the automatically translated text data and the manually translated text data to the requesting device.

In another embodiment, a method comprises receiving, at a translation server, a request for translation services from a requesting device for text data associated with a token and a first language; retrieving, at the translation server, a translated version of the text data in a second language from a translation database storing automatically translated text data and manually translated text data, if the token matches a previously processed token; retrieving, at the translation server, the translated version of the text data in the second language from an automated translation service, if the token does not match the previously processed token; retrieving, at the translation server, the translated version of the text data in the second language from the manual translation service; and transmitting, at the translation server, one or more of the automatically translated text data and the manually translated text data to the requesting device.

In another embodiment, logic is encoded in one or more non-transitory tangible media for execution by a machine, and when executed by the machine operable for: receiving, at a translation server, a request for translation services from a requesting device for text data associated with a token and a first language; retrieving, at the translation server, a translated version of the text data in a second language from a translation database storing automatically translated text data and manually translated text data if the token matches a previously processed token; retrieving, at the translation server, the translated version of the text data in the second language from an automated translation service if the token does not match the previously processed token; retrieving, at the translation server, the translated version of the text data in the second language from the manual translation service; and transmitting, at the translation server, one or more of the automatically translated text data and the manually translated text data to the requesting device.

DETAILED DESCRIPTION

The terms "can", "configured for", and/or "configured to" as used herein with respect to a specific operation refers to a device and/or machine that is physically constructed and arranged to perform the specified operation.

Example embodiments enable a translation system that can be configured to provide language translation services for a client device. A tokenizer module can be configured to associate one or more tokens with text data in a first language. The one or more tokens can be used by the translation system to retrieve previously translated text data in a second language. If the one or more tokens does not match a previous recorded token, the translation system can be configured to trigger the services of an automated translation service. The text data translated by the automated translation service can be stored in a database and associated with the one or more tokens for later retrieval. The text data translated by the automated translation service can be submitted to a manual translation service. The text data translated by the manual translation service can be stored in the database and associated with the one or more tokens for later retrieval.

The example embodiments can be used with any text data that requires language translation. The particular embodiments can be used with any website text data that can be retrieved by users requiring the text data in different languages than that as being posted, e.g. e-commerce websites, news websites, online book publisher websites, etc. A geocoded indicator, e.g., user supplied and/or automatically determined, can be used as a basis for selecting a translation language.

The example embodiments can provide e-commerce website providers with a streamlined path to an international market while reducing or eliminating the need to maintain parallel websites for domestic and international customers.

FIG. 1 illustrates an example system 100 having an apparatus 30 for providing language translated text data, according to an example embodiment. The apparatus 30 is a physical machine (i.e., a hardware device) configured for implementing network communications with other physical machines 10, 20, 25, 40, 50, and 60, within the system 100.

As illustrated in FIG. 1, the system 100 can comprise one or more client devices 10 (e.g, a smart phone, a personal computer, a tablet computer, a smart television, etc.), a website provider server 20, a wide area network (WAN), e.g., the Internet, an aggregating translation server 30, a translation database ("dB") 60 (locally connected or remote), an automated translation service 40 (e.g., automated translation server), and a manual translation service 50 (e.g., e.g., manual translation server). In some embodiments, the aggregating translation server 30 can be configured to act as a proxy server for the client devices 10.

The devices 10, 20, 30, 40, and 50 can be configured to establish communications with the WAN 25 using any of a variety of communication technologies. Example access network communication technologies can comprise a Wi-Fi access point configured for providing a Wi-Fi wireless data link for a Wi-Fi enabled device, a digital subscriber line (DSL) access multiplexer (DSLAM) configured for providing a DSL link for a DSL enabled device via a DSL modem (not shown), a cable modem termination system (CMTS) configured for providing a cable connection (e.g., DOCSIS) (and/or Fiber to-the-Home (FTTH) access node configured for providing a Passive Optical Network (PON) and/or Active Optical Network (AON) connection) to an endpoint device such as a home gateway device (e.g., a "set top box"); and/or a wireless telephone (e.g., 4G and/or Long Term Evolution (LTE)) base station (e.g., an "eNodeB") providing a wireless telephone data link to the devices 10, 20, 30, 40, and 50. Example link layer data connections can comprise, for WiMAX, wireless sensor network connections such as WiHART, ISA100, etc.

One or more of the client devices 10, the website provider server 20, and/or the aggregating translation server 30 can be configured to comprise a translation API 15. The translation API 15 can comprise one or more of a tokenizer module 70 (shown in FIG. 3), a geocoded indicator retrieval module 75 (shown in FIG. 3), and a translation request module 80 (shown in FIG. 3). One or more of the client devices 10, the website provider server 20, and the aggregating translation server 30 can comprise one or more of the tokenizer module 70, the geocoded indicator retrieval module 75, and the translation request module 80. In some embodiments, an Internet browser extension can comprise one or more of the tokenizer module 70, the geocoded indicator retrieval module 75, and the translation request module 80.

The translation API 15 can be configured to monitor the text data being accessed by the client device 10 and/or text data provided by a user of the client device 10. The translation API 15 can be configured to retrieve, via the geocoded indicator retrieval module 75 shown in FIG. 3, a geocoded indicator associated with a current location of the client device 10. The geocoded indicator can be based on an Internet Protocol (IP) address, Global Positioning System (GPS) data, etc. The translation API 15 can be configured to access the aggregating translation server 30, via the translation request module 80, to determine a language associated with the geocoded indicator. In some embodiments, the translation request module 80 can be configured to send the geocoded indicator to the aggregating translation server 30. The aggregating translation server 30 can be configured to perform a translation dB 60 query to determine a language associated with the geocoded indicator.

In some embodiments, the translation API 15 can be configured to determine that the text data being accessed by the client device 10 does not match a language associated with the geocoded indicator, and trigger the services of the aggregating translation server 30. The translation API 15 of the client device 10 can be configured to perform a local database query to determine a language associated with the geocoded indicator. The client device 10 can be configured to send the determined language to the aggregating translation server 30 to perform language translation services based on the client device 10 determined language. In some embodiments, the API 15 of the aggregating translation server 30 can be configured to perform a local database query to determine a language associated with the geocoded indicator. In some embodiments, the geocoded indicator can be user-selectable, e.g., a user can select a language from a drop-down menu. A geocoded indicator associated with the language selected by the user can be transmitted to the aggregating translation server 30 as a basis for performing a language translation on text data into a language selected by the user.

If the client device 10 obtains text data from the website provider server 20, e.g., a web page, the translation API 15 can be configured to suspend text data from being displayed to a user until an appropriate language can be determined and translated text data can be made available for display. If the translation API 15 determines that a language associated with the obtained geocoded indicator matches that of the text data being obtained and/or provided by the user, the translation API 15 can remove the suspension to allow the untranslated text data to be displayed for the user. In some embodiments, a stylesheet can be applied to the text data obtained from the website provider server 20 to hide the text data from the user. If the translation API 15 determines that the obtained geocoded indicator's associated language does not matched that of the text data being obtained by the user, the translation API 15 can trigger the language translation services provided by the aggregating translation server 30 to translate the text data into a language associated with the geocoded indicator. The return of translated text data from the aggregating translation server 30 to the client device 10 can result in removal of the suspension and display of the translated text data for the user of the client device 10 in the localized language associated with the geocoded indicator.

Figure 3:
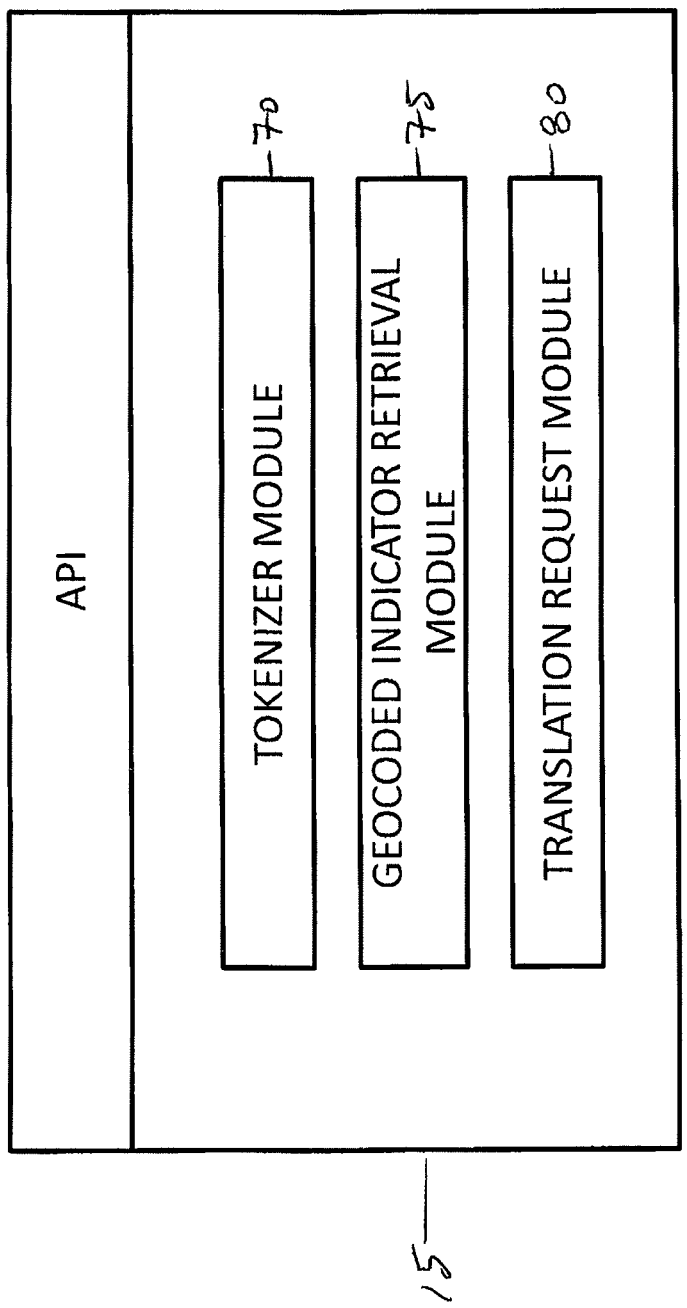
FIG. 3 illustrates a detailed view of the API shown in FIG. 1, according to an example embodiment.

In some embodiments, the translation API 15 can comprise a tokenizer module 70, shown in FIG. 3. The tokenizer module 70 can be configured to parse the text data to be translated and associate one or more translation tokens with the parsed text data. In some embodiments, the one or more translation tokens can comprise, e.g., the actual parsed text data to be translated, a compressed version of the parsed text data, a hashed version of the parsed text data (e.g., using a hash function), and/or an algorithm derived value obtained from the parsed text data (e.g., using a standardized algorithm, using a customized algorithm), etc.

The client device 10 and/or the website provider server 20 can be configured to send a request for translation services to the aggregating translation server 30. The translation API 15 can be configured to trigger transmission of the request comprising the text data (or a link thereto), the one or more translation tokens associated with the text data, and the geocoded indicator to the aggregating translation server 30. In some embodiments, the tokenizer module 70 can be configured to execute in real-time in parallel with other data processing services being executed, e.g., the processing of a web page. The client device 10 and/or the website provider server 20 can be configured to transmit requests for translation of text data into another language synchronously or asynchronously in real-time in parallel with other data processing services being executed. In embodiments where the aggregating translation server 30 is comprised of the tokenizer module 70, the aggregating translation server 30 can be configured to process requests for translation of text data into another language synchronously or asynchronously in real-time in parallel with other data processing services being executed.

The one or more tokens generated by the tokenizer module 70 can be associated with words, phrases, sentences, and/or larger segments of text data. In some embodiments, the same text data can be associated with multiple tokens to increase accuracy of language translation performed for the tokenized text data. For example, a sentence can have an associated token and a phrase within the sentence can have an associated token. The aggregating translation server 30 can be configured to compare a translation of the phrase and sentence, and modify the translation of the sentence and/or the phrase to incorporate the phrase translation, and/or modify the translation of the phrase to incorporate the sentence translation.

In some embodiments, the tokenizer module 70 can be configured to determine that multiple instances of a same token have been generated from a given text data. To reduce bandwidth within the WAN 25 needed to transmit translation requests to the aggregating translation server 30 and to reduce redundant language translation requests from being submitted to the automated translation service 40 and/or the manual translation service 50, the tokenizer module 70 can be configured to send a single token to the aggregating translation server 30. If the client device 10 receives translated text data associated with the single token, the tokenizer module 70 can be configured to replace original text data associated with the multiple instances of the same token with the translated text data received for the single token from the aggregating translation server 30.

The tokenizer module 70 can be configured to find appropriate text data that requires translation by examining content that is not executable code. The tokenizer module 70 can be configured to establish a library of content stored within HTML, XHTML, XML tags, and/or other content. The tokenizer module 70 can be configured to store a position within the text data using, e.g., CSS Paths and/or XPATH, that are associated with tokens. The positions within the text data can be used to rewrite text data in recorded positions once the aggregating translation server 30 returns translated text data. In some embodiments, the tokenizer module 70 can perform word match, e.g., match a word, phrase, sentence, and/or larger segments, etc., in the original text data for all instances of the word, phrase, sentence, and/or larger segments of text data, etc., and replace the original text data with translated text data returned by the aggregating translation server 30.

The translation request module 80 (shown in FIG. 3) of the translation API 15 can be configured to trigger transmission of a request to translate the text data into a different language to the aggregating translation server 30. The request to translate the text data can comprise the one or more tokens generated by the tokenizer module 70, the text data (and/or a representation of the text data, e.g., a hashed representation of the text data, a link to the text data to be translated, etc.) associated with the one or more tokens, and the geocoded indicator. The aggregating translation server 30 can be configured to use the link to the text data to retrieve the text data from the website provider server 20.

In some embodiments, the website provider server 20 can comprise the tokenizer module 70 to parse the text data and associate one or more translation tokens with the parsed text data. The tokenizer 70 can be configured to comprise an HTTP filter to parse served content. In some embodiments, the tokenizer 70 can be configured to parse the text data and assign tokens to portions of a web page and/or an entire web page. The translation API 15 of the website provider server 20 can be configured to send the parsed text data of the portions of the web page and/or entire web page and associated token(s) assigned to the parsed text data to the aggregating translation server 30. In some embodiments, the website provider server 20 can transmit a link to the text data to be translated to the aggregating translation server 30.

In some embodiments, the aggregating translation server 30 can comprise the translation API 15 to parse the text data to be translated (via the tokenizer module 70) and automatically assign tokens to words, phrases, sentences, etc. and/or an entire web page, etc.

Figure 2:
FIG. 2 illustrates an example implementation of the apparatus of FIG. 1, according to an example embodiment.

FIG. 2 illustrates an example implementation of any one of the devices 10, 20, 25, 30, 40, and 50 of FIG. 1, according to an example embodiment.

Each apparatus 10, 20, 25, 30, 40, and/or 50 can comprise a network interface circuit 44, a processor circuit 46, and a memory circuit 48. The network interface circuit 44 can comprise one or more distinct physical layer transceivers for communication with any one of the other devices 10, 20, 25, 30, 40, and/or 50 according to the appropriate physical layer protocol (e.g., WiFi, DSL, DOCSIS, 3G/4G, Ethernet, etc.) via any of the links 27 and 29 (e.g., a wired or wireless link, an optical link, etc.), as appropriate. The processor circuit 46 can be configured for executing any of the operations described herein, and the memory circuit 48 can be configured for storing any data or data packets as described herein.

Any of the disclosed circuits of the devices 10, 20, 25, 30, 40, and/or 50 (including the network interface circuit 44, the processor circuit 46, the memory circuit 48, and their associated components) can be implemented in multiple forms. Example implementations of the disclosed circuits comprise hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that comprises logic for performing the described operations, or a software-based circuit that comprises a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, rotating disk, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can comprise electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 4:
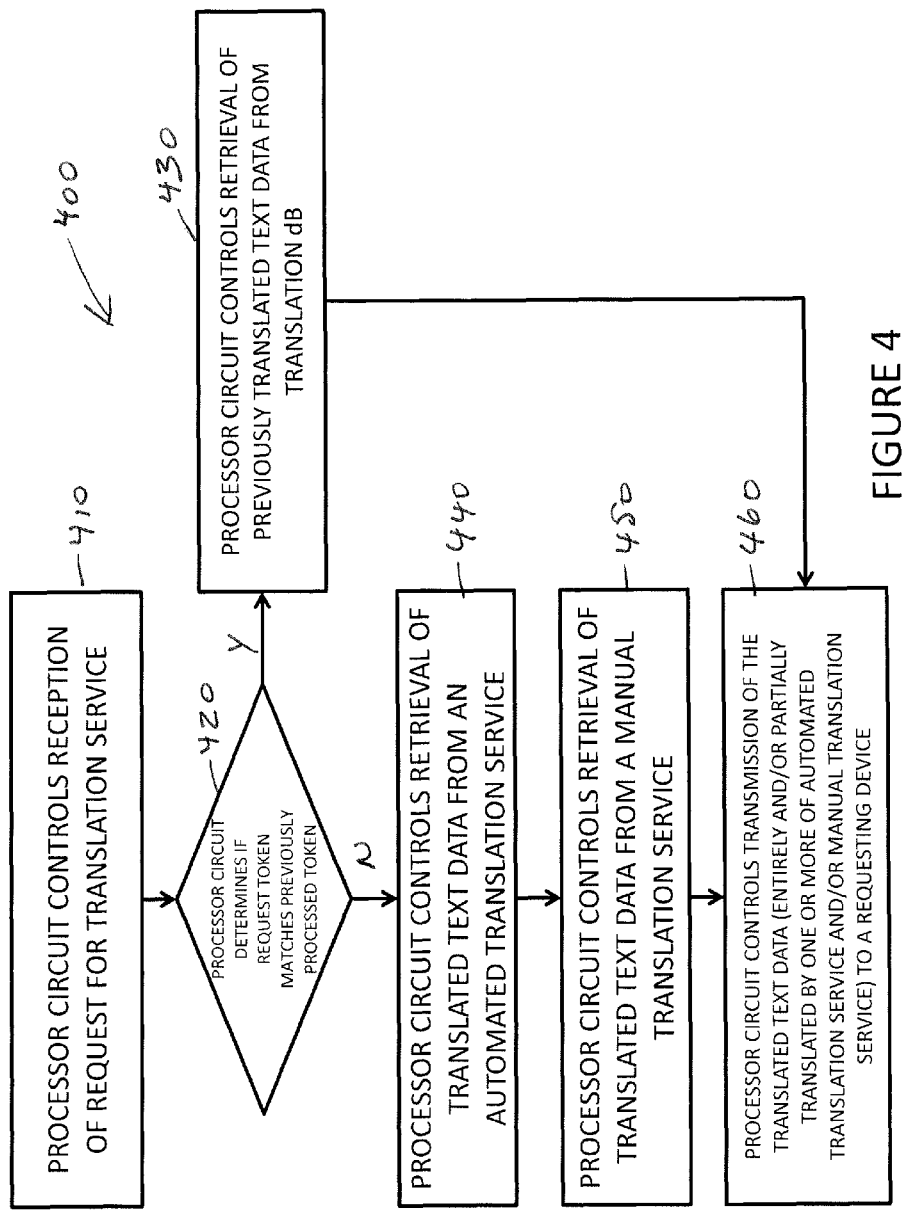
FIG. 4 illustrates an example method of providing translated text data, according to an example embodiment.

FIG. 4 illustrates an example method of providing translated text data, according to an example embodiment. As described in combination with respect to FIGS. 1 and 2, the aggregating translation server 30 (executed for example by processor circuit 46 of FIG. 2 and/or a logic circuit) can implement a method 400 of providing translated text data, according to example embodiments.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic (implemented using one or more integrated circuits) that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 410, the processor circuit 46 of the aggregating translation server 30 can be configured to control reception of a request for translation of text data into another language, as discussed above. The request for translation of text data can comprise tokens associated with the text data to be translated, links to the text data, the text data, a geocoded indicator associated with a current location of a device requesting language translation services, etc.

Referring to operation 420, the processor circuit 46 of the aggregating translation server 30 can be configured to determine if a translation token associated with text data requested to be translated into a different language matches a previously processed translation token stored in the translation dB 60. The aggregating translation server 30 can be configured to query the translation dB 60 with one or more translation tokens and the geocoded indicator. If the aggregating translation server 30 determines a match between one or more newly assigned translation tokens and one or more previously processed tokens stored in the translation dB 60, the processor circuit 46 of the aggregating translation server 30 in operation 430 can be configured to control retrieval of previously translated text data associated with the one or more newly assigned translation tokens, from the translation dB 60. The previously translated text data retrieved in operation 430 can comprise text data translated by the automated translation service 40 and/or text data translated by the manual translation service 50.

In some embodiments, the tokens stored in the translation dB 60 can be configured for restricted use. For example, a URI of an originating web page associated with text data being translated can be stored. Queries to the translation dB 60 can be limited to text data that exists within the URI, across an entire website, and/or across a website(s) provided by a particular website provider server 20.

In operation 440, the processor circuit 46 of the aggregating translation server 30 can be configured to control retrieval of translated text data from the automated translation service 40, as discussed above. If the one or more translation tokens associated with the parsed text data are not stored in the translation dB 60, the aggregating translation server 30 can be configured to submit the text data to be translated to the automated translation service 40, e.g., Google translation services. In some embodiments, the translation API 15 can be configured to trigger a default automated translation service 40 from a plurality of available automated translation services 40. The aggregating translation server 30 can request the text data be translated into a language associated with the geocoded indicator. The aggregating translation server 30 can receive the text data translated into a different language from the automated translation service 40. The aggregating translation server 30 can be configured to store the translated text data (e.g., translated by the automated translation service 40 and/or the manual translation service 50) associated with the geocoded indicator and the one or more translation tokens in the translation dB 60. The aggregating translation server 30 can be configured to replace the translated text data translated by the automated translation service 40 and stored in the translation dB 60 with the translated text data translated by the manual translation service 50 and stored in the translation dB 60.

The processor circuit 46 can be configured to control retrieval, in operation 450, of translated text data from the manual translation service 50, as discussed above. The aggregating translation server 30 can be configured to transmit a request for manual translation of at least a portion of text data to the manual translation service 50. A user of the aggregating translation server 30 can login to a dashboard where the user can review all submissions to the aggregating translation server 30 for language translation services. The user of the aggregating translation server 30 can review each translation request and the translation request's automated translation, choose alternative translation API 15 translation results, edit the translation results produce by the automated translation service 40, and/or trigger transmit the translated text data, e.g., translated by the automated translation service 40, to the manual translation service 50. In some embodiments, text data that has been manually translated can be re-submitted to the manual translation service 50 for re-translation to attempt to obtain a more accurate language translation of the text data.

In operation 460, the processor circuit 46 of the aggregating translation server 30 can be configured to control transmission of text data translated into a different language to a requesting device, e.g., the client device 10 and/or the website provider server 20, as discussed above. The text data transmitted to the requesting device can comprise one or more of text data translated by the automated translation service 40 and/or text data translated by the manual translation service 50. In some embodiments, translated text data can comprise text data that is partially translated by the manual translation service 50 and partially translated by the automated translation service 40, text data that is entirely translated by the automated translation service 40, and/or text data that is entirely translated by the manual translation service 50.

The aggregating translation server 30 can maintain metadata (shown in more detail in FIG. 5) associated with the translation tokens and associated with translated text data stored in the translation dB 60. The metadata can comprise such information as, e.g., a translation source (automated translation service 40 and/or manual translation service 50), when (date/time) the translated text data was last modified, when (date/time) the translated text data was last accessed, an identification of an accessing device, e.g., client device 10 identification, website provider server 20 identification, etc.

In some embodiments, the aggregating translation server 30 can be configured to generate billing information based on the metadata. An owner of website provider server 20 can establish a contractual relationship with an owner of the aggregating translation server 30. The metadata stored in the translation dB 60 can comprise the billing information associated with language translation services provided for the website provider server 20. For example, a merchant operating the website provider server 20 can pay for language translation services provided by the translation system 10 for the merchant's international shoppers. In some embodiments, an owner of the website provider server 20 can resell language translation services provided by the aggregating translation server 30. The aggregating translation server 30 can be configured to search the translation dB 60 for language translations provided for a particular website provider server 20 and generate billing information for those language translations.

The aggregating translation server 30 can provide the owner of the website provider server 20 with statistical information related to the translation services provided by the aggregating translation server 30. The website provider server 20 can be configured to provide the owner with a dashboard indicating statistics associated with language translation services being performed by the aggregating translation server 30, e.g., how often certain words, phrases and/or tokens are being translated, how each translation option can be used at the client devices 10, etc. The statistical information can be displayed to the owner of the website provider server 20 and/or be provided to the owner with billing information.

In some embodiments, the manual translation service 50 can be configured as a distribution point for distributing translation work to translators. The manual translation service 50 can provide names of human translators and/or a listing of translation agencies. The manual translation service 50 can provide information related to availability of the human translators, availability of the translation agencies, accuracy of the human translators and/or the translation agencies as rated by, e.g., website owners etc. If submitted to the human translators and/or the translation agencies, the manual translation service 50 can be configured to provide the human translators and/or the translation agencies with a dashboard of words, phrases and/or tokens, etc. which need translated into a different language.

The manual translation service 50 can provide the human translators and/or the translation agencies with an interface indicating revenue available for the translation of words, phrases and/or tokens, etc. The manual translation service 50 can be configured to provide translators with an in-context link, e.g., URL, and/or a phrase within an existing non-translated version of the text data.

In some embodiments, the aggregating translation server 30 can be executed as a translation platform to provide translation services or a translation marketplace. The manual translations stored in translation dB 60 can be offered to owners of website provider servers 20.

FIG. 5 illustrates an example translation dB record 500, according to an example embodiment.

An example translation record 500 can comprise a token column 510, a geocoded indicator column 520, a text data column 530, an entry date column 540, and a source of translation column 550.

The token column 510 can comprise unique tokens associated with text data, and associated with a geocoded indicator associated with a language of the text data. For example, token "67942" can be associated with text data "la biblioteca" which can be associated with geocoded indicator "348" indicating Spanish language, entry date "2013-04-22", and source of translation "M".

The geocoded indicator column 520 can comprise geocoded indicators that are associated with a language of the text data in the text data column 530. In some embodiments, a particular row in the geocoded indicator column 520 can comprise multiple geocoded indicators if associated text data is the same text data in multiple languages.

The text data column 530 can comprise text data retrieved from the automated translation service 40 and/or the manual translation service 50. In some embodiments, entries in the text data column 530 can comprise the original text data and the translated text data.

The entry date column 540 can comprise a date associated with text data from the text data column 530. The entry date can be entered and/or modified if the text data is entered and/or modified into the translation record 500. In some embodiments, the entry date column 540 can comprise a log of dates associated with multiple entries and/or modifications of text data from the text data column 530.

The source of translation column 550 can comprise a translation indicator indicating whether associated text data was translated via the automated translation service 40 and/or via the manual translation service 50. The source of translation can be designated with an "A" for language translation performed by the automated translation service 40 and an "M" for language translation performed by the manual translation service 50. In some embodiments, the source of translation column 550 can comprise names of human translators and/or a listing of translation agencies. The translation record 500 can comprise a log of human translators and/or a listing of translation agencies that provided translation services for a particular text data entry in the translation record 500.

Hence, the translation system 10, via access to the translation dB 60 containing automatically translated text data and manually translated text data, is able to provide much more accurate translation services. The manually translated text data stored in the translation dB 60 minimizes the number of manual translations that must be performed for particular text data.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. An apparatus comprising:
 a network interface configured to establish communications with a requesting device;
 a processor circuit configured to:
  control receiving a request for translation services from the requesting device for text data associated with a token and a first language, the token generated by a token device, the token comprises a defined numerical value assigned to items of text content and the token is associated with (i) numerical geocoded indicator denoting a current location of the requesting device, (ii) a language corresponding to the numerical geocoded indicator and (iii) an indication of a date that the items of text content were entered, or modified, in a translation database;
  control retrieving a translated version of the text data in a second language from the translation database storing automatically translated text data associated with an automated translation service and manually translated text data associated with a manual translation service in an instance in which the token matches a previously processed token, generated by the token device, stored in the translation database;
  determining that the second language, to which the text data of the first language is translated, corresponds to the language associated with the numerical geocoded indicator that is associated with the token;
  control retrieving the translated version of the text data in the second language from the automated translation service in an instance in which the token does not match the previously processed token;
  control retrieving the translated version of the text data in the second language from the manual translation service in the instance in which the token matches the previously processed token; and
  control transmitting one or more of the automatically translated text data and the manually translated text data to the requesting device.

2. The apparatus of claim 1, wherein:
 one or more of the requesting device and a website provider server comprise an application programming interface (API) to trigger the request for translation services.

3. The apparatus of claim 1, wherein:
 the translated version of the text data is partially translated by the automated translation service and partially translated by the manual translation service.

4. The apparatus of claim 1, wherein:
 the translated version of the text data is entirely translated by the manual translation service.

5. The apparatus of claim 1, wherein the processor controls submission of at least a portion of the text data to the manual translation service.

6. The apparatus of claim 1, wherein the processor controls replacement in the translation database of the automatically translated text data with the manually translated text data obtained.

7. The apparatus of claim 1, wherein:
 the requesting device is a client device.

8. The apparatus of claim 1, wherein:
 the requesting device is a website provider server.

9. The apparatus of claim 1, wherein:
 the token is assigned by a client device.

10. The apparatus of claim 1, wherein:
 the token is assigned by a website provider server.

11. The apparatus of claim 1, wherein:
 the numerical value is associated with one or more items of text data in the second language corresponding to the language associated with the numerical geocoded indicator.

12. The apparatus of claim 1, wherein:
 the request, received from the requesting device, comprises the token and the text data associated with the first language.

13. A method comprising:
 receiving, at a translation server, a request for translation services from a requesting device for text data associated with a token and a first language, the token generated by a token device, the token comprises a defined numerical value assigned to items of text content and the token is associated with (i) numerical geocoded indicator denoting a current location of the requesting device, (ii) a language corresponding to the numerical geocoded indicator and (iii) an indication of a data that the items of text content were entered, or modified, in a translation database;
 retrieving, at the translation server, a translated version of the text data in a second language from the translation database storing automatically translated text data and manually translated text data, in an instance in which the token matches a previously processed token, generated by the token device, stored in the translation database;
 determining, at the translation server, that the second language, to which the text data of the first language is translated, corresponds to the language associated with the numerical geocoded indicator that is associated with the token;
 retrieving, at the translation server, the translated version of the text data in the second language from an automated translation service, in an instance in which the token does not match the previously processed token;
 retrieving, at the translation server, the translated version of the text data in the second language from a manual translation service in the instance in which the token matches the previously processed token; and transmitting, at the translation server, one or more of the automatically translated text data and the manually translated text data to the requesting device.

14. The method according to claim 13, wherein:
one or more of the requesting device and a website provider server comprise an application programming interface (API) to trigger the request for translation services.

15. The method according to claim 13, wherein:
the translated version of the text data is partially translated by the automated translation service and partially translated by the manual translation service.

16. The method according to claim 13, wherein:
the translated version of the text data is entirely translated by the manual translation service.

17. The method according to claim 13, further comprising:
submitting at least a portion of the text data to the manual translation service.

18. The method according to claim 13, further comprising:
replacing, in the translation database, the automatically translated text data with the manually translated text data.

19. The method according to claim 13, wherein:
the requesting device is a client device.

20. The method according to claim 13, wherein:
the requesting device is a website provider server.

21. The method according to claim 13, wherein:
the token is assigned by a client device.

22. The method according to claim 13, wherein:
the token is assigned by a website provider server.

23. The method of claim 13, wherein:
the numerical value is associated with one or more items of text data in the second language corresponding to the language associated with the numerical geocoded indicator.

24. The method of claim 13, wherein:
the request, received from the requesting device, comprises the token and the text data associated with the first language.

25. A computer program product comprising one or more non-transitory tangible media having computer-readable program code portions stored therein for execution by a processor and when executed by the processor operable for:
receiving, at a translation server, a request for translation services from a requesting device for text data associated with a token and a first language, the token generated by a token device, the token comprises a defined numerical value assigned to items of text content and the token is associated with (i) geocoded indicator denoting a current location of the requesting device, (ii) a language corresponding to the numerical geocoded indicator and (iii) an indication of a data that the items of text content were entered, or modified, in a translation database;

retrieving, at the translation server, a translated version of the text data in a second language from the translation database storing automatically translated text data and manually translated text data, in an instance in which the token matches a previously processed token, generated by the token device, stored in the translation database;

determining, at the translation server, that the second language, to which the text data of the first language is translated, corresponds to the language associated with the numerical geocoded indicator that is associated with the token;

retrieving, at the translation server, the translated version of the text data in the second language from an automated translation service, in an instance in which the token does not match the previously processed token;

retrieving, at the translation server, the translated version of the text data in the second language from a manual translation service in the instance in which the token matches the previously processed token; and transmitting, at the translation server, one or more of the automatically translated text data and the manually translated text data to the requesting device.

26. The computer program product of claim 25, wherein:
the numerical value is associated with one or more items of text data in the second language corresponding to the language associated with the numerical geocoded indicator.

27. The computer program product of claim 25, wherein:
the request, received from the requesting device, comprises the token and the text data associated with the first language.

* * * * *

UNITED STATES PATENT AND TRADEMARK OFFICE
CERTIFICATE OF CORRECTION

PATENT NO. : 9,965,466 B2
APPLICATION NO. : 14/332717
DATED : May 8, 2018
INVENTOR(S) : Yursil A. Kidwai et al.

It is certified that error appears in the above-identified patent and that said Letters Patent is hereby corrected as shown below:

In the Claims

Column 11, Line 39: Please remove "(i) numerical" and replace with --(i) a numerical--.
Column 12, Line 44: Please remove "(i) numerical" and replace with --(i) a numerical--.
Column 14, Line 8: Please remove "(i) geocoded" and replace with --(i) a geocoded--.

Signed and Sealed this
Thirty-first Day of July, 2018

Andrei Iancu
*Director of the United States Patent and Trademark Office*